United States Patent [19]

Shimada et al.

[11] Patent Number: 5,469,749
[45] Date of Patent: Nov. 28, 1995

[54] MULTIPLE-FUNCTION FLUID MEASURING AND TRANSMITTING APPARATUS

[75] Inventors: Satoshi Shimada; Seiichi Ugai, both of Hitachi; Tomoyuki Tobita, Katsuta; Yoshimi Yamamoto, Naka, all of Japan

[73] Assignee: Hitachi, Ltd., Tokyo, Japan

[21] Appl. No.: 411,922

[22] Filed: Mar. 28, 1995

Related U.S. Application Data

[63] Continuation of Ser. No. 948,262, Sep. 21, 1992, abandoned.

[30] Foreign Application Priority Data

Sep. 20, 1991 [JP] Japan .................... 3-241871

[51] Int. Cl.$^6$ ................... G01F 1/38; G01L 7/08
[52] U.S. Cl. .................... 73/861.47; 73/861.02; 73/861.63; 73/721
[58] Field of Search .......... 73/861.02, 861.03, 73/861.48, 861.61, 861.63, 721, 714, 861.47; 374/143

[56] References Cited

U.S. PATENT DOCUMENTS

| | | | |
|---|---|---|---|
| 3,130,586 | 4/1964 | Taylor et al. | 73/730 |
| 3,802,265 | 4/1974 | Wood | 73/861.47 |
| 4,381,668 | 5/1983 | Sato et al. | 73/861.63 |
| 4,637,261 | 1/1987 | Kraus et al. | 73/861.02 |
| 4,799,169 | 1/1989 | Mims | 73/861.02 |
| 4,986,127 | 1/1991 | Shimada et al. | 73/861.61 |

OTHER PUBLICATIONS

Machine Design May 21, 1992, "Single Chip Senses Pressure & Temperature".

Primary Examiner—Richard Chilcot
Assistant Examiner—Harshad Patel
Attorney, Agent, or Firm—Antonelli, Terry, Stout & Kraus

[57] ABSTRACT

A measuring and controlling system is provided which has a control function as well as a measurement function to perform the measurement and control of fluid amounts such as the flow rate, pressure, liquid level, weight and so on by itself in the same field. A pressure receiving unit is directly mounted on a pipe or a container, in which a fluid under measurement exists, in order to detect the temperature, differential pressure and static pressure of the fluid under measurement independently of each other. Means for storing the characteristic of fluids under measurement is provided such that the mass flow rate, weight and liquid level can be calculated. By providing the transmitter with the measurement and control functions, the measurement and control of fluid amounts such as flow rate, pressure, liquid level, weight and so on can be performed in a closed form, thereby making it possible to simplify a correction procedure for the static pressure and temperature, improve the responsibility, and enhance the control performance of the whole plant. Also, a measuring and controlling system can be realized which reduces a wiring amount for connecting with an upper level control unit.

29 Claims, 10 Drawing Sheets

| 1. PERFORM CALCULATION FOR REMOVING CROSS-TALK OF STATIC PRESSURE SENSOR TO DERIVE Es. | NODE ①

2. CALCULATE STATIC PRESSURE P FROM STACK PRESSURE SENSOR OUTPUT Es AND TEMPERATURE SENSOR OUTPUT Et. — 202

3. CALCULATE DIFFERENTIAL PRESSURE $\Delta P'$ USING DIFFERENTIAL PRESSURE SENSOR OUTPUT Es AND TEMPERATURE SENSOR OUTPUT Et, AND DERIVE DIFFERENTIAL PRESSURE VALUE $\Delta P$ BY ADDING CORRECTION BY STATIC PRESSURE P.

4. DERIVE TEMPERATURE T FROM TEMPERATURE SENSOR OUTPUT Et. — 203 / 201

5. DERIVE DENSITY $\rho$ FROM DENSITY SENSOR OUTPUT Ep. — 204

6. CALCULATE FLOW RATE Q, WEIGHT M AND LIQUID LEVEL L FROM STATIC PRESSURE P, DIFFERENTIAL PRESSURE $\Delta P$, TEMPERTURE T AND DENSITY $\rho$. — 205

MULTIPLE-FUNCTION FLUID MEASURING AND TRANSMITTING APPARATUS

This application is a continuation of application Ser. No. 07/948,262, filed Sep. 21, 1992, now abandoned.

BACKGROUND OF THE INVENTION

The present invention relates a novel multiple-function fluid measuring and transmitting apparatus and a measuring, controlling and transmitting system for fluids in a plant which have the function of a differential pressure transmitter which is widely used as measuring equipment for detecting a flow rate, pressure or liquid level in a chemical plant and so on as well as a control function such as a loop controller.

Figure 14:
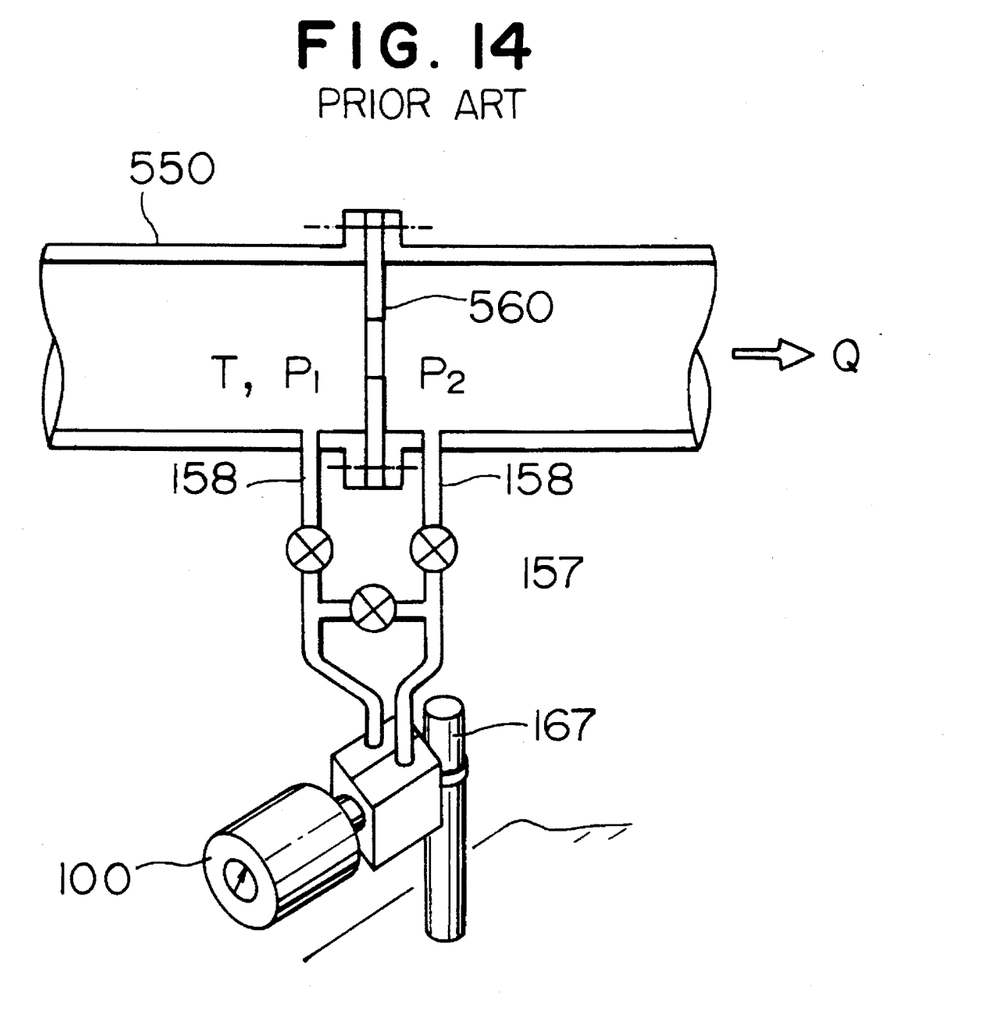
FIG. 14 is a diagram illustrating the arrangement of a plant system which employs conventional transmitting apparatus.

An example of a conventional differential transmitter is shown in FIG. 14. The pressure is delivered to be measured by differential transmitter 100 through high pressure pipe 158 and three valves 157 provided at the opposite ends of orifice 560 installed at a part of pipe 550 through which water to be measured flows.

Conventional differential transmitters are made so large and heavy for protecting a sensor disposed therein that they cannot be directly installed on a pipe 550 through which a fluid under measurement flows. Also, due to their low reliability, they are removably mounted on a special post 167 separate from a pipe or a container, so as to facilitate a regular maintenance. For this reason, such a differential pressure transmitter requires not only a pressure introducing pipe durable to a high pressure and a valve but also gas and drain releasing means 157, thereby causing a cost to be increased.

Since the detection of the flow rate requires a sensing of a temperature T and a static pressure Ps of a fluid under measurement, a temperature transmitter and a pressure transmitter are disposed on an identical pipe line to measure these two parameters and transmit them to an upper level control unit which in turn calculates the flow rate from the measured parameters. In other words, two or more transmitters respectively for sensing a pressure, differential pressure and temperature are used to calculate the mass flow rate from measured parameters as shown in U.S. Pat. No. 4,562,744.

Recently commercialized intelligent differential pressure transmitters are also used in accordance with this convention, so that even if they are provided with a composite sensor constituted of differential pressure, static pressure and temperature sensors formed on a single substrate, the temperature of a fluid under measurement cannot be correctly measured because the fluid is cooled by a pressure introducing pipe, whereby the temperature sensor is presently used for merely correcting the characteristic of the differential pressure transmitter.

For detecting the flow rate, therefore, a temperature transmitter and a pressure transmitter both are disposed on an identical pipe line, as mentioned above, for sensing a temperature T and a static pressure Ps of a fluid under measurement and transmit them to an upper level control unit which performs a calculation to measure a flow rate. For this reason, this method is problematic in that the measurement and control of a rapidly fluctuating mass flow rate is particularly difficult, and an additional cost is needed as there is required two or more transmitters.

Further, the above-mentioned conventional differential pressure transmitter is so large and heavy that it cannot be directly installed on a pipe through which a fluid under measurement flows and therefore is separately mounted on a special post apart from a pipe or a container so as to facilitate removal of the differential pressure transmitter since the reliability is so low that a regular inspection is necessary. This installation requires not only a pressure introducing pipe durable to a high pressure and a valve, but also gas and drain releasing means, thereby resulting in increasing a cost.

SUMMARY OF THE INVENTION

It is an object of the present invention to provide a multiple-function fluid measuring apparatus which is capable of singly measuring a differential pressure, a pressure, a temperature, a mass flow rate of a fluid under measurement as well as a liquid level and a mass of a liquid in a container, in other words, to provide a multiple-function fluid measuring apparatus provided with three functions conventionally performed by differential pressure, pressure and temperature transmitters.

It is another object of the present invention to provide a multiple-function fluid measuring apparatus of a type directly mountable on a pipe or a container which is economical and so reliable that no maintenance is necessary.

It is a further object of the present invention to provide, in addition to the above multiple-function fluid measuring apparatus having three measuring functions, a multiple-function fluid measuring apparatus which is capable of controlling an actuator on the basis of a calculated deviation between a measured value and a target value.

It is a further object of the present invention to employ, in a fluid plant, the multiple-function fluid measuring apparatus having a control function to highly accurately control the temperature, pressure, mass flow rate, liquid level and mass.

It is a further object of the present invention to provide an economic control managing system for a fluid plant with a good responsibility by using the above-mentioned multiple-function fluid measuring apparatus having a control function.

To achieve the above object, a pressure receiving unit is adapted to be directly mountable on a conduit or a container, whereby a composite sensor provided therein detects a temperature as well as differential pressure and pressure of a fluid under measurement. Further, the mass flow rate of the fluid under measurement in a conduit and the liquid level and mass of a fluid in a container are calculated from a characteristic map of the fluid which has previously been prepared in a memory serving as storage means.

Further, to achieve the other objects, parts which have been employed in a conventional transmitter are reduced in number, size and weight by using the semiconductor IC technology to simultaneously enhance the economical efficiency and reliability. Also achieved are the remote setting by the use of digital communications, elimination of the necessity of maintenance by diagnosis and update operations, and improvement of the reliability.

To achieve the other objects, a transmitter is provided with a bi-directional communication circuit for receiving and transmitting measured values of fluid amounts, such that a deviation between a target value set and stored by instructions from an upper level control unit or a portable communicator and a currently measured value is calculated by a calculating and storage means, and a control amount is directly transmitted to an actuator in accordance with a predetermined algorithm, thereby controlling fluid amounts such as pressure, mass, liquid level, flow rate and temperature.

Also, measured values, measuring conditions and control states of the fluid amounts to be measured and controlled, and the result of self-diagnosis of the apparatus are remotely monitored via digital communications by the upper level control unit or the portable communicator. Since the fluid amount measuring and controlling apparatus is provided with a means for displaying these data and results, the states of the apparatus and the system can be monitored even in the field.

To achieve the other objects, until the calculating and storage means in the fluid amount measuring apparatus receive a preferential instruction from the upper level control unit or the portable communicator for changing the setting of target values, control amounts are directly transmitted to related actuators and resulting fluid amounts are measured again in accordance with a previously stored algorithm for performing a control of the fluid amounts corresponding to a previously set target value in the field. By thus eliminating the necessity of communications with the upper level control unit and correspondingly reducing a time required for the communications, an in-field closed control system with a fast response is provided.

A pressure receiving unit is directly mounted on a conduit or a container so as to allow the multiple-function fluid measuring apparatus to directly contact a fluid under measurement, thereby making it possible to detect the temperature as well as static pressure and differential pressure of the fluid under measurement from signals generated by static pressure, differential pressure and temperature sensors formed inside the pressure receiving unit.

The bi-directional communication circuit provided in the multiple-function fluid measuring apparatus allows the apparatus to mutually perform digital communications with the upper level control unit or the portable communicator. Thus, deviations between target values which have been set and stored by instructions from the upper level control unit or the portable communicator and currently measured values are derived by the calculating and storage means, and control amounts calculated on the basis of the deviations are directly transmitted to actuators in accordance with a predetermined algorithm to control fluid amounts such as pressure, flow rate and temperature.

Likewise, measured values, measuring conditions and control states of the fluid amounts to be measured and controlled, and the result of self-diagnosis of the apparatus are remotely monitored via digital communications by the upper level control unit or the portable communicator, and the fluid amount measuring apparatus is provided with a means for displaying these data and results, whereby the states of the apparatus and the system can be monitored even in the field, thus achieving the improvement in reliability of the apparatus and the system.

DESCRIPTION OF THE PREFERRED EMBODIMENTS

Embodiments of apparatus for implementing the present invention will hereinafter be described with reference to FIGS. 1 to 13.

Generally, a flow rate is detected according to the following equation (1) by a differential pressure $\Delta P$ developed when a liquid pressurized by a pressurizing pump passes through an orifice arranged in a pipe line:

$$Q = \alpha \epsilon Fr \sqrt{\frac{2\Delta P}{\rho_1}} \qquad (1)$$

$$\alpha = \sqrt{\frac{C}{1.\beta^4}} \qquad (2)$$

where Q represents a volume flow; C a flowout coefficient; $\beta$ a ratio of the diameter of a restriction hole to the inner diameter of a conduit; $\epsilon$ a gas expansion coefficient; $\rho_1$ a correction coefficient of the density (upstream side) (which is proportional to the temperature and pressure in the case of a gas); and Fr the dimension of the restriction hole.

The output from a differential pressure sensor is influenced by a static pressure Ps and a temperature T, if these parameters largely fluctuate. Also, when a flow rate is to be measured, a static pressure Ps added to a pipe line and a change in ambient temperature act as external disturbances which must be removed to the utmost. Specifically, for correcting the characteristic of a transmitter, an intelligent differential pressure transmitter is employed which comprises a composite sensor having a differential pressure sensor, a static pressure sensor and a temperature sensor formed on a single substrate.

Figure 1:
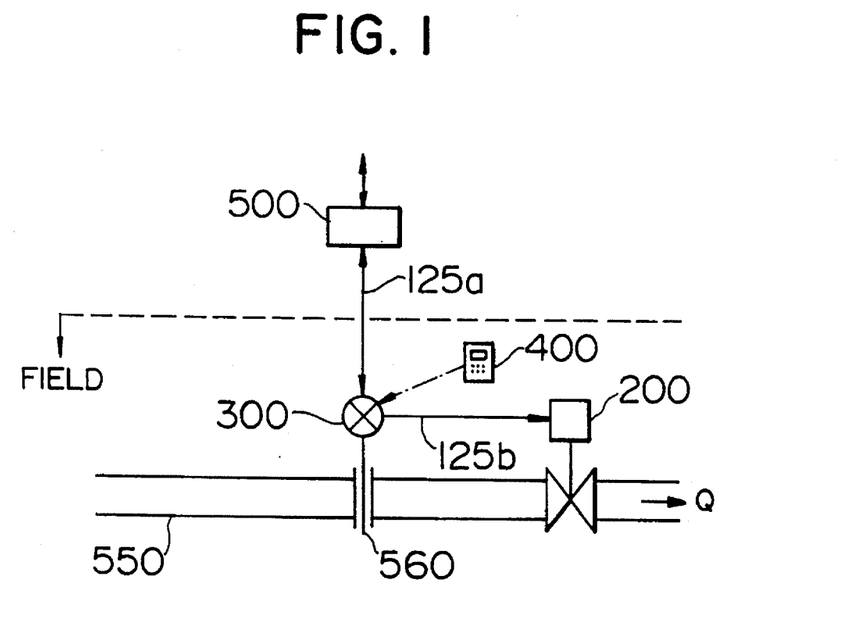
FIG. 1 is a diagram illustrating the arrangement of a plant system which employs a multiple-function fluid measuring and transmitting apparatus according to the present invention.
Figure 2:
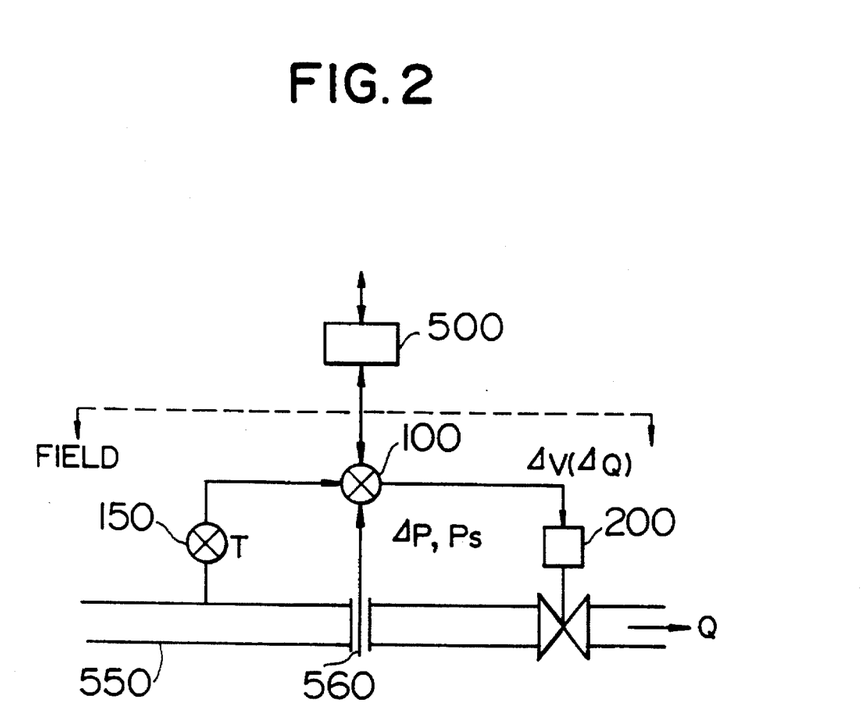
FIG. 2 is a diagram illustrating another embodiment of a plant system which employs the multiple-function fluid measuring and transmitting apparatus according to the present invention.
Figure 3:
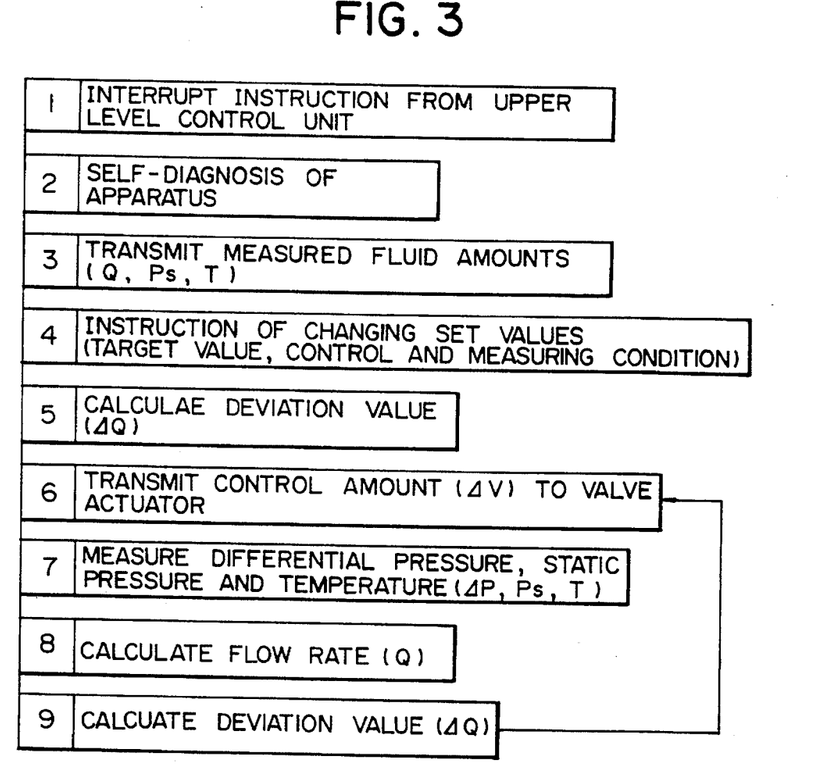
FIG. 3 is a schematic explanatory diagram of a control procedure according to the present invention.

FIG. 1 illustrates an example of a fluid measurement and control system for a chemical plant or the like according to the present invention; FIG. 2 illustrates a modified example of the system shown in FIG. 1; and FIG. 3 is a flow chart illustrating an algorithm of a measurement and control method of the present invention. A fluid measuring and transmitting apparatus 300 of the present invention is directly installed on a pipe line or a container for measuring and controlling physical amounts of a fluid under measurement, as will be later described.

Description will now be made for the case where a flow rate is measured and controlled. Referring to FIG. 1, a differential pressure ΔP developed on both sides of a differential pressure generating element 560 such as an orifice arranged in the middle of a pipe line 550, a static pressure Ps and a temperature T are measured, and transmitted to the fluid measuring and transmitting apparatus 300 for calculating a flow rate in the pipe line and to a control unit 500 as electric signals. Simultaneously, a deviation value ΔQ is calculated, and a control amount Δv is sent to a valve actuator 200 which in turn controls a valve in accordance with the sent control amount to control the flow rate of a fluid in the pipe line 550. This procedure is executed in the following manner as shown in FIG. 3:

(1) In response to an interrupt instruction from the total control unit 500 or a portable communicator 400, (2) the fluid measuring and transmitting apparatus performs a self-diagnosis and transmits a report on the presence or absence of abnormality and;

(3) measured or calculated fluid amounts such as a flow rate, static pressure Ps, temperature T and so on are transmitted to the total control unit and the portable communicator.

(4) If the total control unit or the like does not instruct any change in measurement conditions such as a target control amount of the fluid, a control condition (such as PID control, fuzzy control parameters and so on), the fluid measuring and transmitting apparatus;

(5) calculates a deviation value ΔQ;

(6) and sends a control amount Δv to the valve actuator as an electric signal, and the valve actuator opens or closes the valve on the basis of the control amount transmitted thereto to control the flow rate of the fluid within the pipe.

(7) The fluid measuring and transmitting apparatus again measures a differential pressure ΔP, static pressure Ps and temperature T;

(8) calculates a flow rate Q; and (9) calculates the deviation value ΔQ to control the flow rate to a target value.

Generally, minor loops in the field are performing the flow rate control from (5) to (10), however, when an interrupt is issued from an upper level apparatus, this interrupt is preferentially processed to respond to the instruction, diagnosis and monitoring from (1) to (4).

The portable communicator 400 is provided with a keyboard for input and a display unit for output so as to allow the operator to monitor the state of the system in the field and instruct a change in control amount and so on.

A conventional system has been provided with a temperature transmitter, in addition to differential pressure and pressure transmitters, on an identical pipe line in order to correct the influence of compression of a liquid due to a static pressure and expansion of the liquid due to a temperature rise. However, according to the fluid amount measuring apparatus of the present invention, since a differential pressure and static pressure of a fluid under measurement are detected by a single detector, the flow rate detecting accuracy and responsibility are improved. Also, a closed loop control is performed in the field so as to share part of functions which have conventionally been performed by an upper level control unit, thereby making it possible to simplify the system and efficiently operate the whole plant.

FIG. 2 illustrates a system which has a temperature sensor 150 arranged separately from the fluid amount measuring apparatus 100, wherein the output from the temperature sensor 150 is supplied to the fluid amount measuring apparatus 100 and the measurement and control are performed according to a processing procedure shown in FIG. 3.

Figure 4:
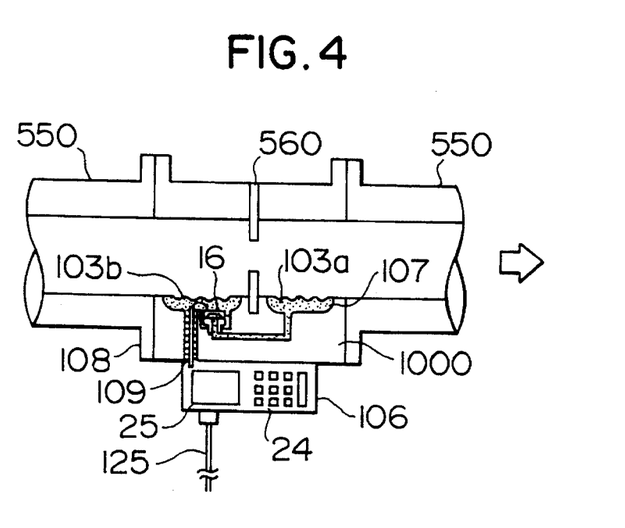
FIG. 4 is a diagram illustrating the whole arrangement of an embodiment of a multiple-function fluid measuring and transmitting apparatus according to the present invention.

The structure of fluid amount measuring apparatus 300 according to the present invention is shown, by way of example, in FIGS. 4–9. Referring first to FIG. 4, a pressure receiving unit 1000 is installed together with a differential pressure generating element 560 in part of a conduit 550 through which a fluid under measurement flows, where an air tight structure is assured by a flange 108. Seal diaphragms 103a, 103b, which isolate a sensor disposed in the apparatus from the external environment for protection, directly contact with the fluid under measurement and receive a pressure thereof. The pressure of the fluid under measurement is received by the seal diaphragms 103a, 103b located on both upstream and downstream sides of the differential pressure generating element 560 which add the respectively received pressures to each side of a composite sensor 16 through a silicon oil 107 which serves as a pressure transmitting medium. The composite sensor 16 has a differential pressure sensor, a static pressure sensor and a temperature sensor formed on a single silicon chip. These sensors respectively convert a pressure, differential pressure and temperature to electric signals which in turn are sent from air tight terminals 109. A signal processing unit 106 amplifies and converts these signals into digital amounts, and thereafter performs a correction and calculation which have been previously programmed by a microprocessor, and transmits the values of measured flow rate, static pressure and temperature to an upper level control unit through an output cable 125 as well as displays these values on a display means 25. Since the silicon oil directly contacts with the fluid under measurement through the seal diaphragms, the temperature of the silicon oil is substantially equal to that of the fluid under measurement, thereby removing the necessity of separately providing a temperature sensor. Also in the present embodiment, the signal processing unit 106 is directly mounted on the pressure receiving unit 1000 such that outputs of the composite sensor 16 are connected to the signal processing unit 106 through terminals 109, whereby noises are not easily mixed in the signals and accordingly accurate measurements are enabled.

However, if the signal processing unit 106 is directly mounted on the pressure receiving unit 1000, a thermal insulating structure must be provided between the signal processing unit and the pressure receiving unit if a fluid under measurement is at high temperatures.

Figure 5:
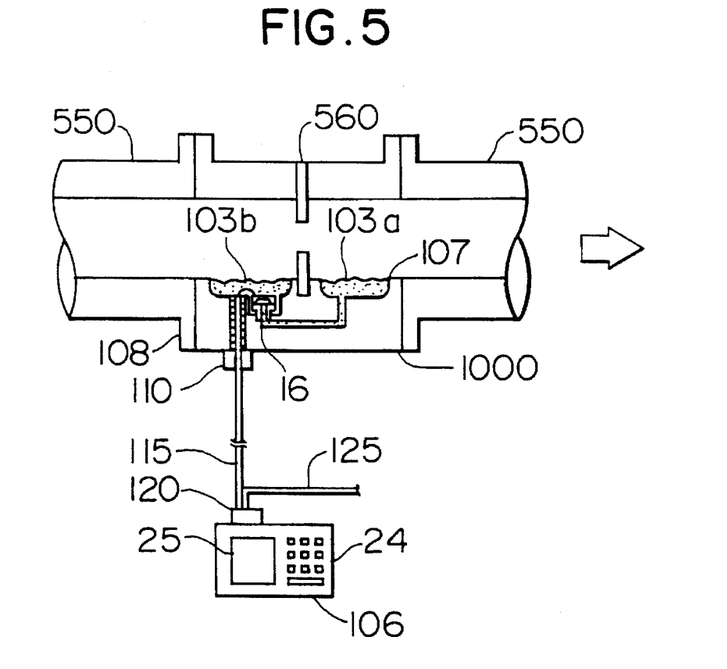
FIG. 5 is a diagram illustrating the whole arrangement of another embodiment of the multiple-function fluid measuring and transmitting apparatus according to the present invention.

FIG. 5 illustrates another embodiment of the present invention, where the same reference numerals as those in FIG. 4 designate the same parts. The structure shown in FIG.

5 differs from that of FIG. 4 in that the signal processing unit 106 is located separately from the pressure receiving unit 1000 and connectors 110, 120 of the signal processing unit 106 and the pressure receiving unit 1000 are connected by an extension line 115. This structure can prevent electronic parts with a relatively low heat resistivity from malfunctioning even if the temperature of a fluid under measurement in a pipe or a container exceeds 100° C. It should be noted, however, that variations in accuracy occurring during the manufacturing process of the apparatus are stored in a memory as the results of characteristic measurement of the pressure receiving unit, which is performed upon shipping from the factory, as a characteristic map of each pressure receiving unit, so that this memory is located on the pressure receiving unit side. The memory is located near the connector 110 where external air produces a cooling effect in order to prevent malfunctions due to a temperature rise. If the circuit portion up to an A/D convertor is disposed in part of the pressure receiving unit, the extension line 115 passes only digital signals and accordingly the influence of external noise is reduced, whereby the extension line may be made longer.

Figure 6:
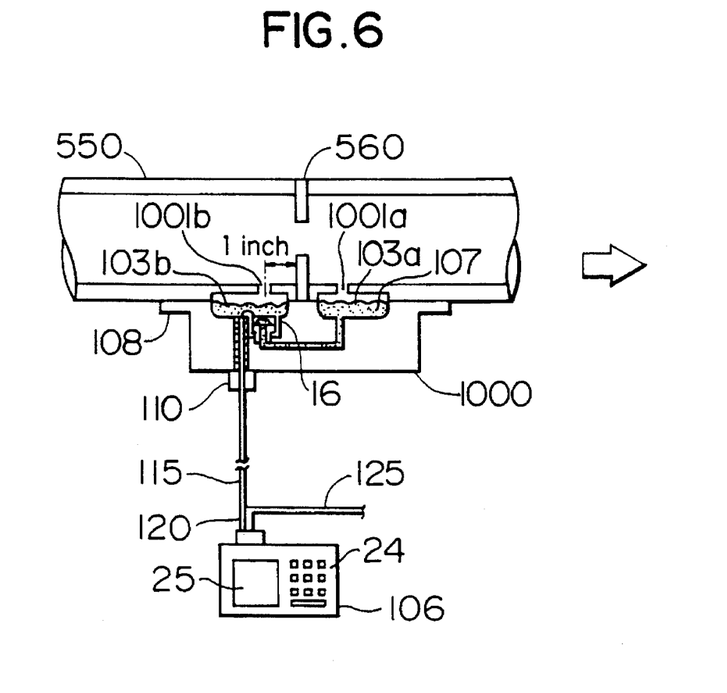
FIG. 6 is a diagram illustrating the whole arrangement of a further embodiment of the multiple-function fluid measuring and transmitting apparatus according to the present invention.

FIG. 6 illustrates a further embodiment of the present invention. Conventionally, the flow rate measurement by using the differential pressure generating element 560 such as an orifice is widely employed in industrial plants and so on because the shape and size of the orifice have been globally standardized and maintained on the basis of the results of experiments made in real flows. The value of differential pressure differs in dependence on the pressure introducing positions on the upstream and downstream sides of the orifice. Further, as illustrated, it is also necessary to form tap holes 1001a, 1001b through part of the conduit to define this size. When the holes are positioned respectively at an equal distance of 1 inch (25.4 mm) from the orifice as illustrated, this is a method called "flange tap". There are also a vena contracta tap method, a corner tap method and so on. In accordance with these methods, actually measured values of the flow rate coefficient α shown in the foregoing equation (1) are prepared as standard values by the JIS, ASME and DIN standards. The present embodiment provides the pressure receiving unit with a mounting structure corresponding to a variety of tap methods as mentioned above. Incidentally, it is preferable that the seal diaphragms are located as closely as possible to the conduit in order to measure the temperature of a fluid under measurement in a required accuracy. Practically, the temperature of a fluid under measurement may be measured within ±1° C. For practically designing this structure so as to prevent the temperature from falling more than 1° C., the distance between a seal diaphragm and a conduit may be approximately 10 mm if the apparatus is made of a metal, although it differs depending on the kind of a fluid under measurement and an external temperature.

Figure 7:
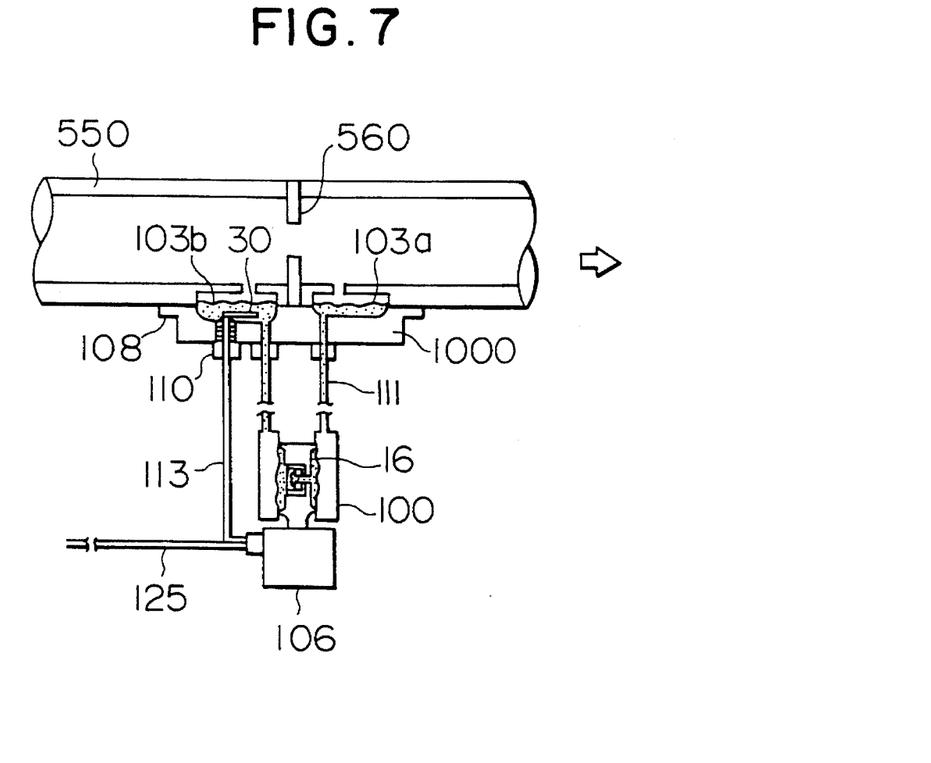
FIG. 7 is a diagram illustrating the whole arrangement of a further embodiment of the multiple-function fluid measuring and transmitting apparatus according to the present invention.

FIG. 7 illustrates a further embodiment of the present invention. In this embodiment, seal diaphragms, which have been disposed on the transmitter side in a conventional intelligent transmitter, are disposed on the pressure receiving unit side, and the pressure is introduced to a composite sensor 16 through capillary tubes 111 which are filled with silicon oil. A temperature sensor 30 is also disposed on the silicon oil filled side of one of the seal diaphragms for detecting a temperature of a fluid under measurement and generating a signal indicative of the detected temperature. The output from the sensor 30 is transmitted to a signal processing unit 106 through a shield line 113. In summary, the present invention may be implemented by a conventional intelligent transmitter 100 with simple modifications. The temperature sensor 301 only detects a temperature from a pressure receiving unit 1000 which is disposed near the seal diaphragm in contact with the fluid and generates a temperature signal, while a differential pressure and static pressure of the fluid under measurement are measured by conventional intelligent transmitters and a flow rate of the fluid flowing through the conduit is calculated in accordance with the processing procedure shown in FIG. 3.

Incidentally, the shield line 113 is employed in order to prevent noise from influencing the signal from the temperature sensor 30 which generally presents a small value. Although the present embodiment is more complicated than those of FIGS. 4, 5 and 6, it is compact in comparison with a conventional system. It is possible to form a closed measurement and control loop in the field by adding simple modifications to a conventional intelligent transmitter.

Figure 8:
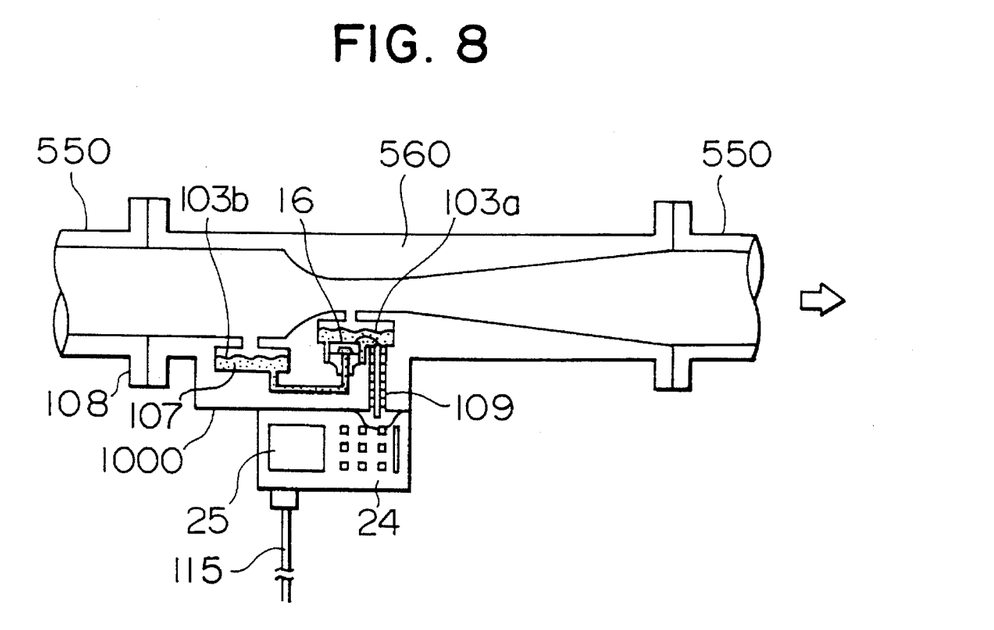
FIG. 8 is a diagram illustrating the whole arrangement of a further embodiment of the multiple-function fluid measuring and transmitting apparatus according to the present invention.

FIG. 8 illustrates a further embodiment of the present invention. This embodiment is an example which employs a Venturi tube 560 as a differential pressure generating element. The structure shown in FIG. 8 differs from that of FIG. 6 in that the differential pressure generating element 560 itself is integrated with a pressure receiving unit 1000 of a fluid amount measuring and controlling apparatus. However, there is no essential difference in action. Although the size of the apparatus is slightly larger, this structure is appropriate if a pressure drop given to a fluid under measurement must be reduced.

Figure 9:
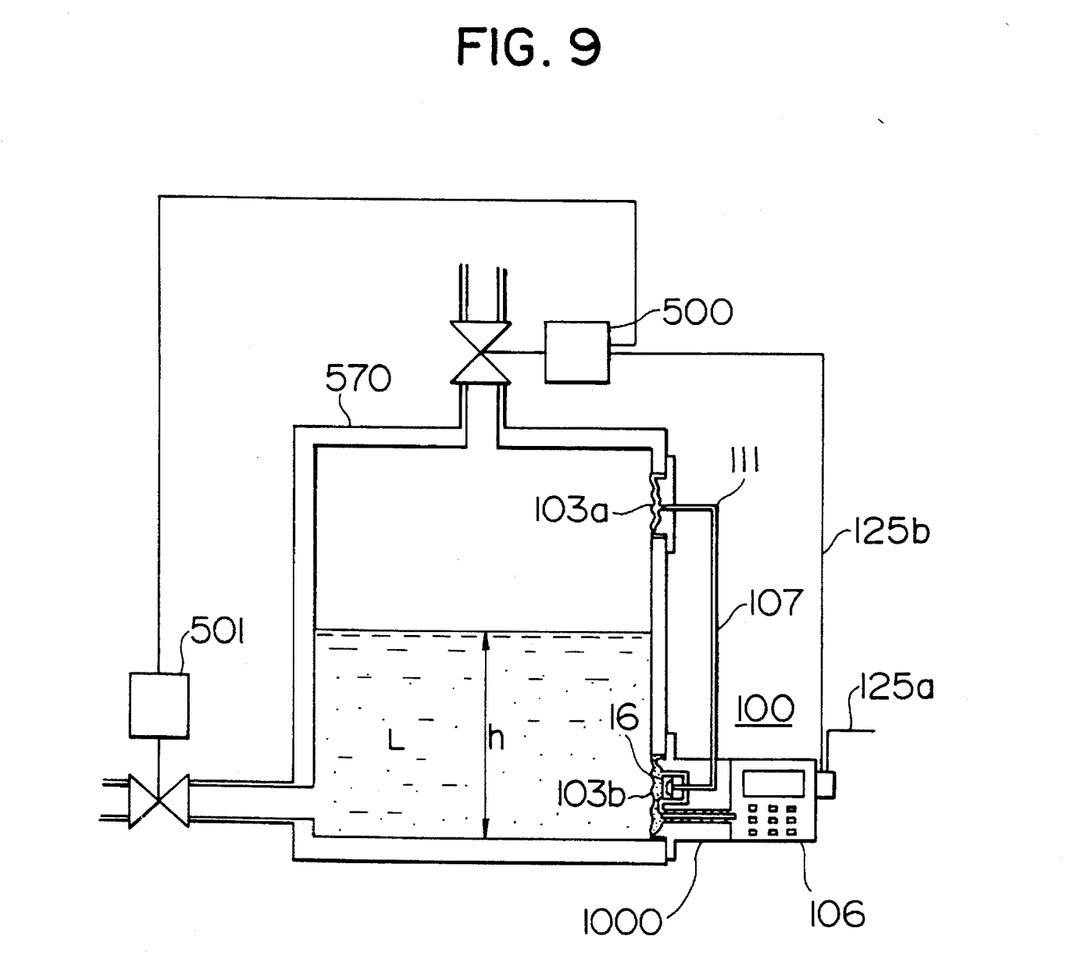
FIG. 9 is a diagram showing the whole arrangement of an embodiment which employs the multiple-function fluid measuring and transmitting apparatus of the present invention as a liquid level indicator.

FIG. 9 illustrates an embodiment which employs the present invention for measuring and controlling a liquid level. As illustrated, a pressure receiving unit 1000 is mounted on a lower portion of a container 570 for storing a fluid L, while a flange provided with a seal diaphragm 103a is mounted on an upper portion where the liquid does not reach. Silicon oil 107 is introduced to a composite sensor 16 by a capillary tube 111. The pressure receiving unit 1000 is provided with the composite sensor 16, isolated by and located in the vicinity of a seal diaphragm 103b, which can directly measure a pressure, differential pressure ΔP, and temperature T of the fluid L under measurement. If the differential pressure can be detected from the output of a differential pressure sensor, ΔP is calculated; if the outer diameter of the container is known, the volume of the container is calculated; and if the specific gravity ρ of the fluid L is known, its weight is calculated, whereby a liquid level h can be finally calculated from the following equation (3). Also, a correction calculation can be performed for expansion and contraction of the fluid by using outputs of a static pressure sensor and a temperature sensor comprised in the composite sensor. The inner diameter d of the container, the specific gravity ρ of the fluid, and an expansion and contraction ratio of the liquid have been previously stored in a memory.

$$\Delta P = \rho g h \qquad (3)$$

where ρ represents the specific gravity of the fluid; g the gravitational acceleration; and h a liquid level.

The foregoing measurement and calculation results are transmitted to an upper level control unit through a transmission line 125a. Also, a deviation value between a control target value and a measured value of the liquid level is calculated, and a control amount is transmitted as an electric signal to valve actuators 500, 501 through a transmission line 125b to control the liquid level.

As described above, the measurement and control apparatus of this system controls a plurality of actuators in relation with each other depending on a control object and transmits the situation to an upper level control unit. Since the apparatus of the present embodiment performs functions such as measurement and calculation for each detection terminal, the upper level control unit can perform upper level controls such as monitoring of a plurality of systems, harmonic control and so on which should be originally performed by the upper level control unit.

The fluid amount measuring apparatus of the present invention achieves the simplification of the structure and reduction of parts in size and weight. The pressure receiving unit is disposed on part of the conduit 550 so as to directly contact with a fluid under measurement, thereby making it possible to measure a temperature, in addition to pressure and differential pressure, of the fluid under measurement by the composite sensor disposed nearby. For sensing a level and mass of a fluid in a conduit or a container or a flow rate of a fluid flowing through a conduit, the volume and density of that fluid are necessary. These characteristic values, since they depend on temperature, have been previously measured and stored in a memory which serves as a storage means of the apparatus of the present embodiment. Therefore, the mass flow rate of a fluid under measurement can be calculated by a microprocessor with signals from the above-mentioned sensors and the characteristics of the fluid which have previously been stored in the memory. Unlike a conventional differential pressure transmitter shown in FIG. 14, the fluid amount measuring apparatus of the present invention does not require a protection mechanism because a high pressure durable three valve is not used and accordingly an excessive load is not charged on the pressure receiving unit, whereby the pressure receiving unit omitting a sensor diaphragm 120 is extremely simple.

Figure 10:
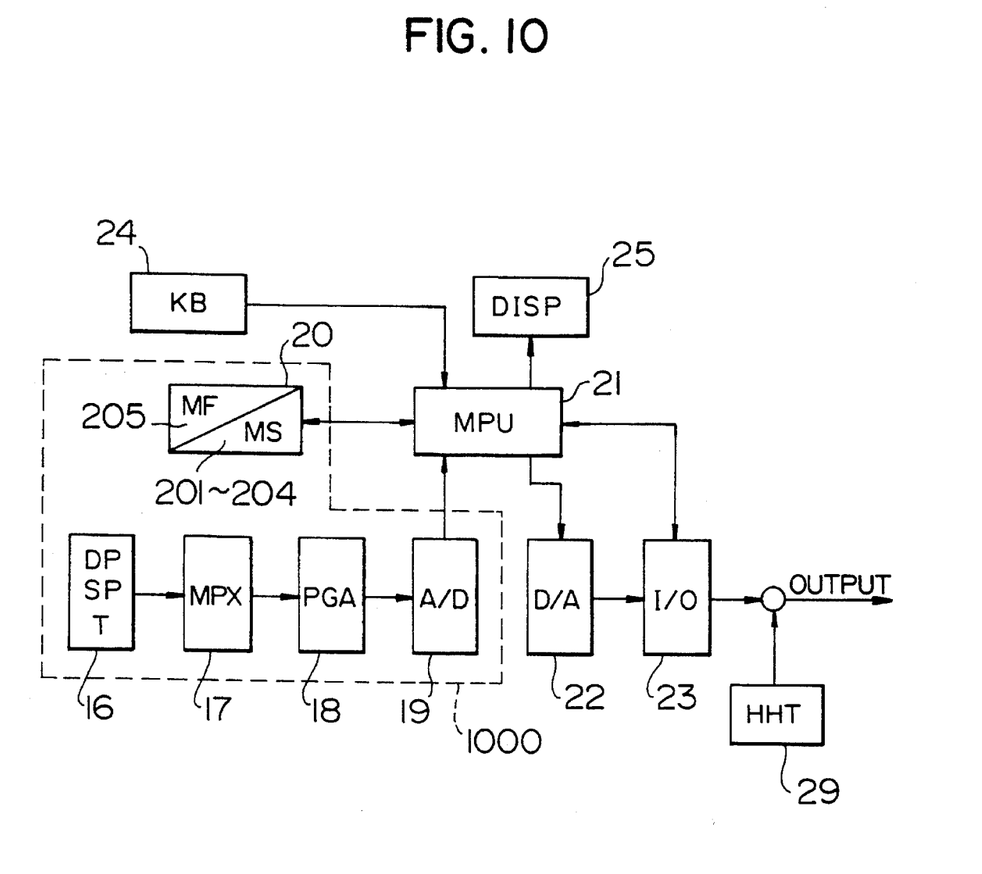
FIG. 10 is a block diagram of the multiple-function fluid measuring and transmitting apparatus of the present invention.

FIG. 10 illustrates a block diagram of the flow rate measuring apparatus of the present invention. Outputs of the differential pressure, pressure, temperature and density sensors included in the composite sensor 16 are selectively fetched by a multiplexer 17, amplified by a programmable gain amplifier 18, and converted to digital signals by an A/D convertor 19. A memory 20 comprises map data MS 201–204 which have previously stored the characteristics of the differential pressure, static pressure, temperature and density sensors in the form of maps, and a map MF 205 which has stored the characteristic of fluids under measurement such as density. A microcomputer 21 calculates the temperature, static pressure and differential pressure by referring to the map data MS 201–204 and also the mass flow rate and weight of a fluid under measurement by using the map MF, as will be later shown in FIG. 11. These measured values are displayed on a display unit 25 as well as transmitted through a communication circuit in an I/O circuit 23 in response to a request from an upper level control unit. When used in an analog control system, the signals generated by the sensors are again converted to analog signals by a D/A convertor 22 and outputted to an analog control unit through a voltage-to-current convertor within the I/O circuit 23. The apparatus of the present invention further compares the measured value derived as described above with a target value given from the upper level control unit, and sends a deviation value therebetween to a valve actuator to control the flow rate or liquid level of the fluid under measurement. The setting of a target value may be carried out even in the field by a keyboard 24 and a portable communicator 29 provided for the apparatus. As described above, the apparatus of the present invention can control fluid amounts such as flow rate, pressure, liquid level and so on in a closed loop form in the field, in addition to a measurement function, thereby realizing not only the improvement of the characteristics such as responsibility but also a measurement and control system which is highly economical, for example, in a wiring cost.

Figure 11:
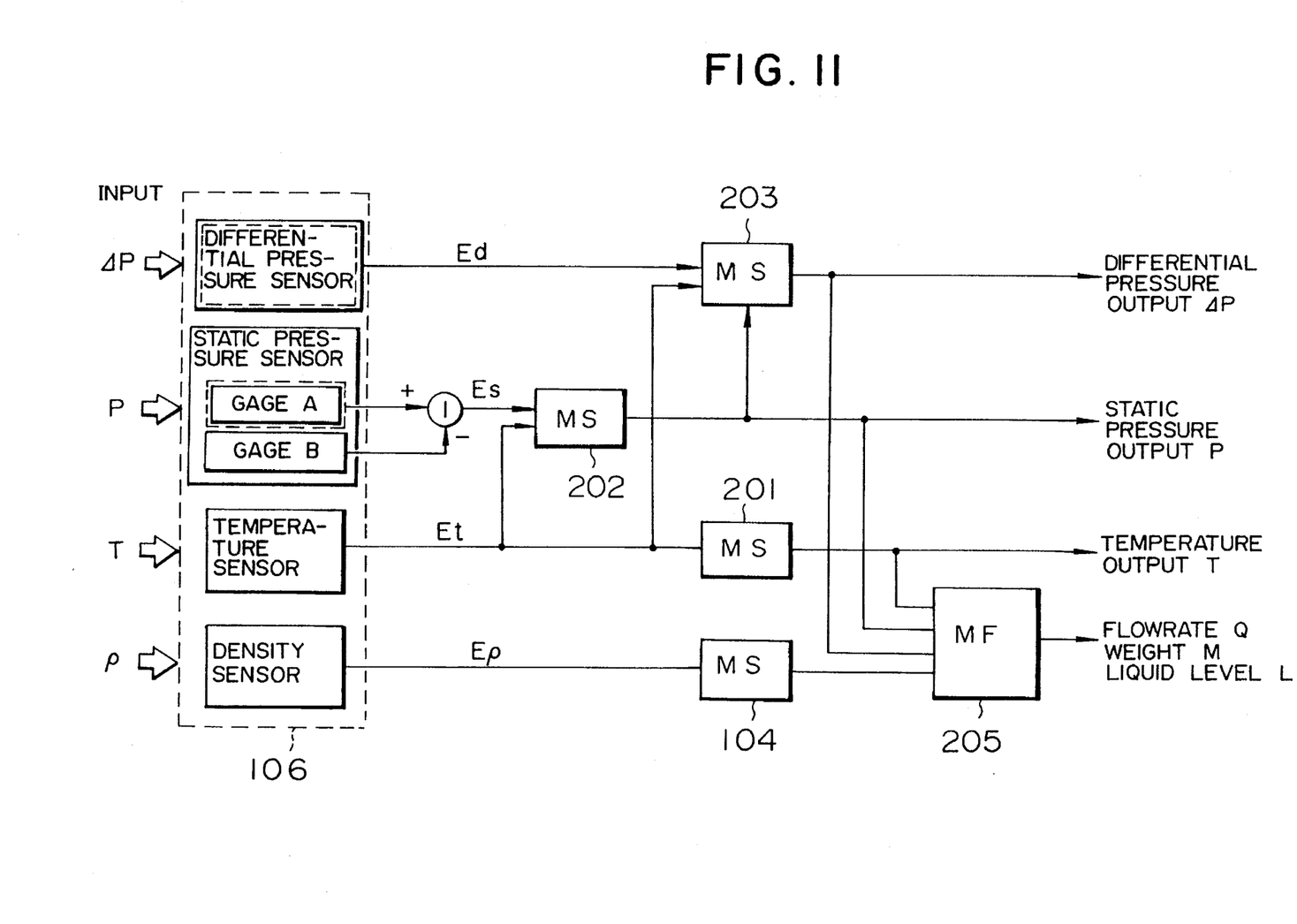
FIG. 11 is an explanatory diagram for explaining a processing of signals from a composite sensor employed in the apparatus of the present invention.
Figure 12:
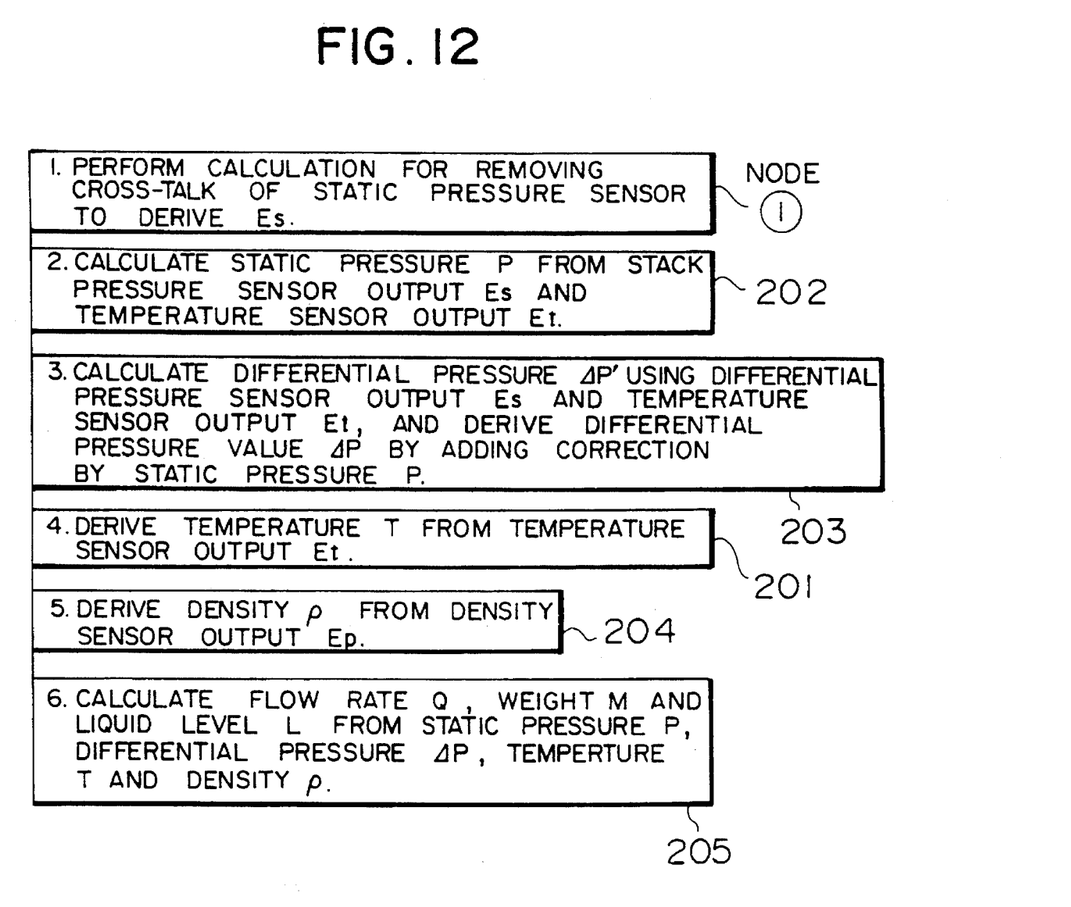
FIG. 12 is a flow chart illustrating a correction calculate processing for signals from the composite sensor employed in the apparatus of the present invention.

FIG. 11 schematically illustrates how to correct outputs of the respective sensors. Although not shown, a correction map MS represents a differential pressure sensor output Ed, a static pressure sensor output Es and a temperature sensor output Et in a three-dimensional form. The microprocessor 21 executes the processing in accordance with a processing procedure shown in FIG. 12. Specifically, at a node ①, after removing a cross talk of the static pressure sensor, a correct static pressure P is derived from the outputs of the static pressure sensor and the temperature sensor by using a correction map 202 and outputted. Next, the differential pressure sensor output Ed is corrected with respect to the temperature by using a correction map 203, and further corrected by using the static pressure sensor output P to derive a correct differential pressure sensor output $\Delta P$. Stated another way, since the characteristics of the static pressure and differential pressure sensors are changed due to the ambient temperature, a signal generated by the temperature sensor is used to precisely execute a correction calculation. Further, these measured values thus derived and the map MF 205 which has stored the characteristics of fluids under measurement such as density p are used to calculate the mass flow rate, weight and liquid level of the fluid under measurement.

Figure 13A:
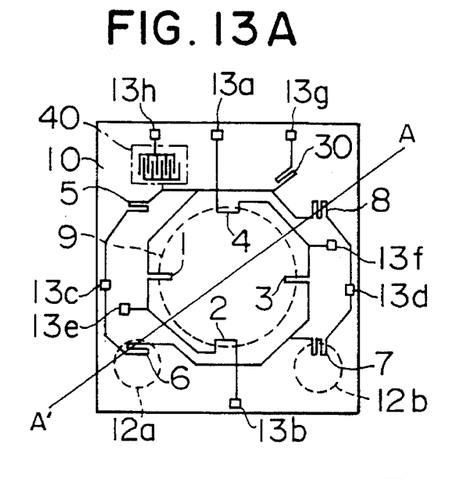
FIGS. 13A to 13D are diagrams illustrating the whole arrangement of an embodiment of the composite sensor employed in the apparatus of the present invention.
Figure 13B:
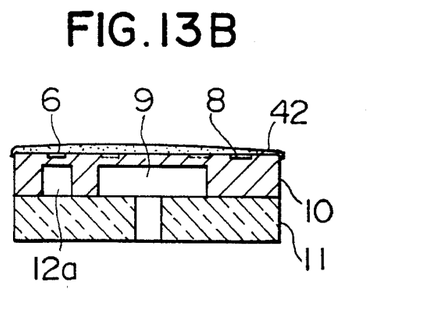
Figure 13C:
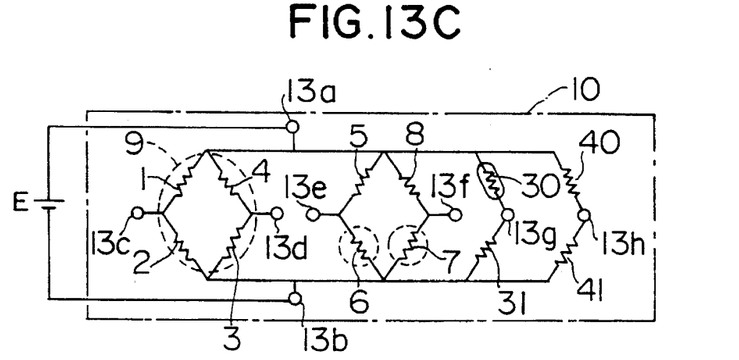

Next, the structure of the composite sensor will be described in detail with reference to FIGS. 13A, B and C. FIG. 13A is a plan view of the composite sensor; FIG. 13B a cross-sectional view taken along the line A—A in the plan view; and FIG. 13C an example of wire connection when the static pressure sensor and the differential pressure sensor are connected to each other. In FIG. 13A, reference numerals 1–4 designate gage resistors for differential pressure detection formed on a semiconductor substrate 10 which is made of a silicon monocrystal by doping impurities into the semiconductor substrate 10 by ion implantation or thermal diffusion. These gage resistors 1–4 are formed in a region of a diaphragm 9 processed by alkali etching, dry etching or the like. Reference numerals 5–8 designate gage resistors for static pressure detection. Stresses are developed in the gage resistors 1–4 due to a differential pressure load. The gage resistance of 1–4 are clanged. A gage resistor 30 is a temperature gage which is located in a fixed portion. The gage resistor 30 is also oriented in the <100> direction in which it is insensitive to stress. Reference numerals 13a–13f designate electrode pads. Incidentally, while a humidity sensor, later referred to, is added in the structure of FIG. 13, it is not necessary during a normal liquid measurement. After wire connection has been made as shown in FIG. 13C (when a liquid is to be measured, resistors 31, 40 and 41 in the drawing is not necessary, and a temperature is measured from a terminal 13g), a fixed voltage is applied between the electrode pads 13a and 13b to derive a differential pressure output between the electrode pads 13c and 13d and a static pressure output between the electrode pads 13e and 13f. Further, FIG. 13C illustrates a structure in which a sensor 40 for humidity detection is connected, in which case the terminal 13g is connected with a dummy resistor 31 while an output 13h of the humidity sensor is connected with a dummy resistor 41. Since these dummy resistors need not be located on the sensor substrate, they are provided separately in the present embodiment.

Reference numeral 11 in FIG. 13B designates a fixing base made of boro-silicated glass for the semiconductor substrate 10. When a differential pressure is loaded on this composite sensor, which results in increasing the resistance values of the gage resistors 1 and 3 and decreasing the gage resistors 2 and 4, the values of which are equal to the gage resistors 1,3 and 2,4, and the direction of which are opposite to same. Therefore, by forming a bridge circuit as shown in FIG. 13C, a static pressure sensor output can be derived which is free of fluctuations due to a differential pressure.

If a humid gas is to be measured by a differential pressure type sensor, a moisture correction is required in addition to the foregoing corrections for static pressure and temperature.

The composite sensor shown in FIG. 13A includes a humidity sensor 40 of a type having a thin film resistor made of polymer or ceramics, the resistance value of which changes in accordance with humidity. As shown in FIG. 13C, the humidity sensor 40 is connected to resistor bridge circuits constituting the static pressure sensor and the differential pressure sensor together with the dummy resistor 41, where humidity is detected from a terminal 13*d* as an electric signal. In this implementation, the seal diaphragms are removed from the structure shown in FIGS. 4 or 5, whereby the composite sensor is directly exposed to a humid gas. The temperature, differential pressure and static pressure sensors are therefore coated with films to prevent the characteristics thereof from being deteriorated by humidity. When the composite sensor provided with the humidity sensor is substituted for the composite sensor shown in FIG. 10, the processing unit 21 can correct for a moisture included in a gas, thereby making it possible to provide a flow rate measuring apparatus suitable for a humid gas. Stated another way, since a moisture correction based on a signal from the humidity sensor can be provided for a volume flow rate calculated from a differential pressure signal, in addition to corrections made by signals from the temperature and static pressure sensors, the provision of a separate humidity meter, hitherto required, is not needed, thereby making it possible to measure the flow rate of a humid gas with a simple structure. A specific method of correction calculation is described in "Measurement Handbook", Section 16.3, "Restriction Flow Meter", pp 830–837, and so on.

Figure 13D:
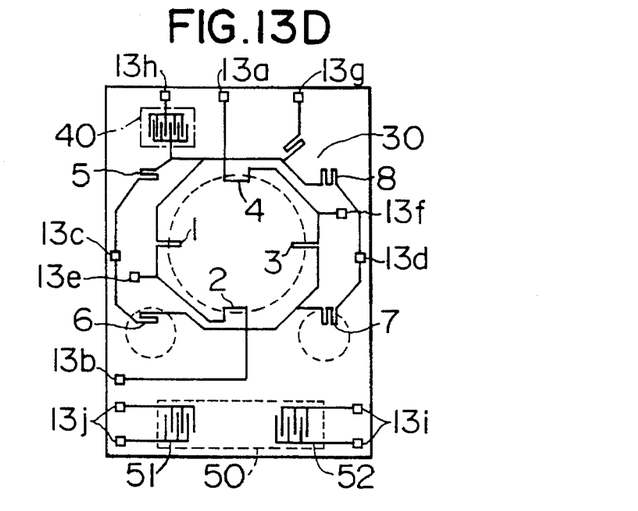

To calculate the flow rate, a correction for density is necessary in addition to that for humidity. Generally, a separate means is used to previously measure and store the density of a fluid, and then the processing unit 21 performs a correction calculation by using the stored density. If a fluid under measurement is a liquid, the density is a function of temperature alone, whereas, the density of a gas also depends on the pressure, so that it is preferable if a density sensor is also formed on the composite sensor. A conventionally used density sensor is so large that a composite sensor including a density sensor has not been realized on a single chip. However, by applying a sensor technique described in Applied Physics Letter, pp 1653–1655, published on May 16, 1988, a composite sensor having a density sensor can be constructed as illustrated in FIG. 13D.

This composite sensor forms a density sensor having a surface elastic wave element on part of a silicon substrate constituting the sensor, which makes use of the fact that the frequency of a surface elastic wave propagating between electrodes varies depending on the density of fluid. Since the density sensor according to this method is influenced by static pressure and temperature to result in a change in frequency, the density sensor need be corrected by output signals from the static pressure and temperature sensors formed on the same silicon substrate. This correction is made in accordance with the correction method for the differential pressure characteristics described above in connection with FIGS. 10 and 11. This composite sensor is realized by the recent progress of the fine processing technique which can compose the respective small sensors on a silicon and integrate, if necessary, a signal processing circuit on the same silicon, thereby making it possible to provide a small sensor which is excellent in mass productivity.

As described above, since the apparatus according to the present invention is provided with a control function in addition to a measurement function, the measurement and control of fluid amounts such as flow rate, pressure, liquid level, weight and so on can be carried out in a closed form in the field, thereby simplifying correction procedures for static pressure and temperature, reducing a processing time required for the measurement and control, and improving the characteristics such as the responsibility.

According to the present invention, burdens to an upper level control unit are alleviated to reduce a processing time required by the system for the measurement and control operation, which leads to improving the control performance in view of the whole plant.

According to the present invention, since the measurement and control can be performed in a closed form in the field, an amount of wire for connecting with an upper level control unit is reduced, thereby realizing a highly economical measuring and controlling system.

According to the present invention, the temperature, differential pressure and static pressure of a fluid under measurement can be detected independently of each other and corrected for density and temperature on the basis of previously stored characteristic data of the fluid under measurement to calculate and measure the mass flow rate, weight and liquid level.

According to the present invention, since the temperature, differential pressure and static pressure can be independently detected with a high accuracy, the functions of a temperature transmitter and differential pressure and pressure transmitters can be achieved by a single apparatus.

Furthermore, according to the present invention, the fluid amount measuring apparatus does not require a protection mechanism because a high pressure durable three valve is not used and accordingly an excessive load is not charged on the pressure receiving unit, whereby the pressure-receiving unit omitting a sensor diaphragm becomes extremely simple. Therefore, a highly economical measuring system can be realized.

We claim:

1. A multiple-function fluid measuring and transmitting apparatus comprising:

a conduit for flowing a fluid under measurement;

a pressure receiving portion provided in said conduit;

a seal diaphragm provided to seal said pressure receiving portion at an inner wall portion of said conduit;

a pressure receiving chamber storing a pressure/temperature communicating fluid;

a differential pressure detecting portion fixed to said conduit and having a differential pressure sensor in contact with said pressure/temperature communicating fluid at a location of said seal diaphragm for detecting a differential pressure condition of said fluid under measurement;

a temperature sensor provided at a position in contact with said pressure/temperature communicating fluid at a location of said seal diaphragm for detecting a temperature condition of said fluid under measurement;

a sensor signal output means for outputting a sensor signal from said differential pressure sensor and said temperature sensor, and;

a calculating means for receiving said sensor signal from said sensor signal output means, for performing compensation using a compensation data stored in a storing means and outputting a measurement signal for indicating a condition of said fluid under measurement.

2. A multiple-function fluid measuring and transmitting apparatus as claimed in claim 1, wherein;

a silicon substrate is used for said differential pressure detecting portion, and said differential pressure sensor and temperature sensor are formed of resistance elements on said silicon substrate.

3. A multiple-function fluid measuring and transmitting apparatus as claimed in claim 1, further comprising:

a static pressure detecting portion having a static pressure sensor fixed at said pressure receiving chamber and being responsive to a static pressure condition of said fluid under measurement;

wherein said sensor signal output means further outputs a static pressure signal from said static pressure sensor such that said calculating means outputs said measurement signal further on a basis of said static pressure signal.

4. A multiple-function fluid measuring and transmitting apparatus as claimed in claim 3, wherein;

a silicon monocrystalline substrate is used for said differential pressure portion and said static pressure detecting portion and said differential pressure sensor, said static pressure sensor and temperature sensor are formed of resistance elements on said silicon monocrystalline substrate.

5. A multiple-function fluid measuring and transmitting apparatus as claimed in claim 4, wherein;

said sensor signal output means includes a multiplexer, and said multiplexer selectively send signals of said differential pressure sensor, said static pressure sensor and said temperature sensor to said calculating means.

6. A multiple-function fluid measuring and transmitting apparatus as claimed in claim 3, wherein;

said storing means includes map data for compensating sensor outputs of said differential pressure sensor, said static pressure sensor and said temperature sensor as said compensation data.

7. A multiple-function fluid measuring and transmitting apparatus as claimed in claim 4, wherein;

said storing means includes memory map data for compensating relationship between a temperature or static pressure and a density or compressibility factor of said fluid under measurement.

8. A multiple-function fluid measuring and transmitting apparatus as claimed in claim 1, wherein;

said pressure receiving portion comprising a differential pressure generating means for generating a differential pressure in said fluid under measurement.

9. A multiple-function fluid measuring and transmitting apparatus as claimed in claim 8, wherein;

said pressure receiving portion comprises an orifice as said fluid under measurement differential pressure generating means.

10. A multiple-function fluid measuring and transmitting apparatus as claimed in claim 8, wherein;

said pressure receiving portion comprises a venturi tube as said fluid under measurement differential pressure generating means.

11. A multiple-function fluid measuring and transmitting apparatus as claimed in claim 1, wherein;

said calculating means is provided thermally isolated from said pressure receiving portion, and receives said sensor signal from said sensor signal outputting means.

12. A multiple-function fluid measuring and transmitting apparatus as claimed in claim 1, wherein;

said storing means stores conduit data concerning said conduit, and said calculating means outputs a flow signal indicating a flow amount of said fluid under measurement from said sensor signal with reference to said conduit data.

13. A multiple-function fluid measuring and transmitting apparatus as claimed in claim 1, wherein;

said storing means stores fluid data concerning said fluid under measurement, and said calculating means obtains a mass flow rate of said fluid under measurement from said sensor signal referenced to said fluid data.

14. A multiple-function fluid measuring and transmitting apparatus as claimed in claim 1, further comprising a display means for displaying a condition of said fluid under measurement obtained by said calculating means.

15. A multiple-function fluid measuring and transmitting apparatus as claimed in claim 1, wherein;

said differential pressure sensor detects a differential pressure by comparing a pressure of said fluid under measurement with one of a pressure of an airtight chamber or atmospheric pressure.

16. A multiple-function fluid measuring and transmitting apparatus as claimed in claim 1, wherein;

said storing means stores conduit data concerning said conduit, and said calculating means outputs a fluid level signal indicating a height of a fluid level of said fluid under measurement in said conduit from said sensor signal referenced to said conduit data.

17. A multiple-function fluid measuring and transmitting apparatus as claimed in claim 1, wherein;

said storing means stores fluid data concerning said fluid under measurement, and said calculating means outputs a mass signal indicating a mass of said fluid under measurement in said conduit from said sensor signal referenced to said fluid data.

18. A multiple-function fluid measuring and transmitting apparatus as claimed in claim 1, wherein;

said apparatus comprises a control apparatus for controlling, and transmitting and receiving control signals with respect to a plurality of other multiple-function fluid measuring and transmitting apparatuses.

19. A multiple-function fluid measuring and transmitting apparatus as claimed in claim 1, wherein;

said multiple-function fluid measuring and transmitting apparatus controls a plurality of actuators by transmitting control signals to said plurality of actuators.

20. A multiple-function fluid measuring and transmitting apparatus as claimed in claim 1, wherein;

said multiple-function fluid measuring and transmitting apparatus carries out setting of set target value of said fluid condition from an external communication apparatus by way of wireless communication using infrared light.

21. A multiple-function fluid measuring and transmitting apparatus as claimed in claim 1, wherein said seal diaphragm is provided on less than an entire circumferential portion of an inner wall of said conduit.

22. A compact electronic multiple-function fluid measuring and transmitting apparatus comprising:

a conduit for flowing a fluid under measurement;

a pressure receiving portion provided in said conduit;

a seal diaphragm provided to seal said pressure receiving portion at an inner wall portion of said conduit;

a pressure receiving chamber storing a pressure/temperature communicating fluid;

an electronic differential pressure detecting portion fixed to said conduit and having a differential pressure sensor in contact with said pressure/temperature communicating fluid at a location of said seal diaphragm for electronically detecting a differential pressure condition of said fluid under measurement;

an electronic temperature sensor provided at a position in contact with said pressure/temperature communicating fluid at a location of said seal diaphragm for electronically detecting a temperature condition of said fluid under measurement;

a sensor signal output means for outputting a sensor signal from said differential pressure sensor and said temperature sensor, and;

a calculating means for receiving said sensor signal from said sensor signal output means, for performing compensation using a compensation data stored in a storing means and outputting a measurement signal for indicating a condition of said fluid under measurement.

23. A multiple-function fluid measuring and transmitting apparatus as claimed in claim 22, wherein said seal diaphragm is provided on less than an entire circumferential portion of an inner wall of said conduit.

24. A compact silicon-based multiple-function fluid measuring and transmitting apparatus disposed on part of a conduit containing a major mass of a transitory working fluid so as to directly contact with said major mass of said working fluid to provide at least differential pressure measurement and temperature measurement of said working fluid in direct contact with said major mass of said working fluid said apparatus comprising:

a conduit for containing said major mass of working fluid;

a pressure receiving portion provided in said conduit;

a seal diaphragm provided to seal said pressure receiving portion at less than an entire circumferential portion of an inner wall of said conduit so as to provide a differential pressure and temperature communicating seal between said major mass of said working fluid and a pressure/temperature communicating fluid;

a pressure receiving chamber holding said pressure/temperature communicating fluid;

a differential pressure detecting portion fixed to said conduit and having a silicon-based differential pressure sensor in contact with said pressure/temperature communicating fluid for electronically detecting a differential pressure condition of said working fluid;

a silicon-based temperature sensor provided at a position in contact with said pressure/temperature communicating fluid at a location of said seal diaphragm for electronically detecting a temperature condition of said working fluid;

a sensor signal output means for outputting a sensor signal from said differential pressure sensor and said temperature sensor, and;

a calculating means for receiving said sensor signal from said sensor signal output means, for performing compensation using a compensation data stored in a storing means and outputting a measurement signal for indicating a condition of said working fluid.

25. A multiple-function fluid measuring and transmitting apparatus comprising:

a conduit for flowing a fluid under measurement;

at least one pressure receiving space adjacent a wall portion of said conduit, and connected for fluid communication with said conduit using at least one tap hole;

a seal diaphragm provided within said at least one pressure receiving space to define a pressure receiving chamber storing a pressure/temperature communicating fluid;

a differential pressure detecting portion fixed to said conduit and having a differential pressure sensor in contact with said pressure/temperature communicating fluid at a location of said seal diaphragm for detecting a differential pressure condition of said fluid under measurement;

a temperature sensor provided at a position in contact with said pressure/temperature communicating fluid at a location of said seal diaphragm for detecting a temperature condition of said fluid under measurement;

a sensor signal output means for outputting a sensor signal from said differential pressure sensor and said temperature sensor, and;

a calculating means for receiving said sensor signal from said sensor signal output means, for performing compensation using a compensation data stored in a storing means and outputting a measurement signal for indicating a condition of said fluid under measurement.

26. An apparatus as claimed in claim 25, wherein:

said at least one pressure receiving space is constituted by a first pressure receiving space adjacent a wall portion of said conduit, and connected for fluid communication with said conduit using a first tap hole, and a second pressure receiving space adjacent a wall portion of said conduit, and connected for fluid communication with said conduit using a second tap hole; and, said seal diaphragm is constituted by a first seal diaphragm provided within said first pressure receiving space to define a first pressure receiving chamber storing a first pressure/temperature communicating fluid, and a second seal diaphragm provided within said second pressure receiving space to define a second pressure receiving chamber storing a second pressure/temperature communicating fluid; and said differential pressure sensor being in contact with said first pressure/temperature communicating fluid and said second pressure/temperature communicating fluid for detecting said differential pressure condition of said fluid under measurement.

27. An apparatus as claimed in claim 25, wherein;

a silicon substrate is used for said differential pressure detecting portion, and said differential pressure sensor and temperature sensor are formed of resistance elements on said silicon substrate.

28. An apparatus as claimed in claim 25, wherein said at least one tap hole is at least capillary in size.

29. An apparatus as claimed in claim 25, wherein said at least one tap hole is provided on less than an entire circumferential portion of an inner wall of said conduit.

\* \* \* \* \*